United States Patent Office 3,264,245
Patented August 2, 1966

3,264,245
PREPARATION OF AN AQUEOUS POLYVINYL
ALCOHOL COMPOSITION
Harold King Sinclair, Wilmington, Del., assignor to E. I.
du Pont de Nemours and Company, Wilmington, Del.,
a corporation of Delaware
No Drawing. Filed May 27, 1964, Ser. No. 370,720
3 Claims. (Cl. 260—29.6)

This invention relates to polyvinyl alcohol compositions containing gelling agents, and also to methods for the controlled gelation of aqueous polyvinyl alcohol solutions.

This application is a continuation-in-part of my copending application Serial No. 354,154, filed March 23, 1964, and now abandoned.

Many methods for gelling aqueous polyvinyl alcohol solutions are known in the art. Many of these prior art gelling agents generally act instantaneously. That is, these compounds crosslink polyvinyl alcohol immediately upon contact therewith. Such prior art gelling agents are satisfactory where such instantaneous reaction can be tolerated, for example, in the application of such a gelling agent to the surface of a preformed polyvinyl alcohol film.

However, in many instances it is desired to prepare an aqueous polyvinyl alcohol solution containing a gelling agent which remains stable for extended periods of time (in some instances, a matter of days or weeks) without causing any significant amount of gelation, but which upon subjection to convenient treatment then effects the gelation of the solution. Moreover, there has been a long-recognized need for a gelling agent which the manufacturer of polyvinyl alcohol may add to the dry product, from which product the consumer can prepare a stable, fluid, nongelled aqueous solution, and then effect gelation thereof by convenient treatment when desired.

For example, recently polyvinyl alcohol has been shown to be very useful in the preparation of very light weight foams suitable as insulating, acoustical, and packaging materials. In the preparation of such foams, it is necessary to first prepare an aqueous polyvinyl alcohol solution containing a gelling agent which does not cause instantaneous gelation. Next, the foam is generated from the solution, which is then flowed through a hose or pipe to the position or place of application, whereafter it is essential that the polyvinyl alcohol foam very quickly gel.

It will be recognized that the gelling agent must not cause any substantial gelation during the preparation of the polyvinyl alcohol solution or during the generation of foam. However, gelation must occur within seconds or at the most a few minutes after the foam is placed in final position. This is essential for at least one of four reasons: (1) to assure stability of foam structure regardless of how slowly drying occurs, which may require several days or even weeks; (2) to prevent drainage of substantial quantities of liquid to lower levels; (3) to prevent soaking of the foam liquid into porous building materials such as plasterboard, wallboard, electrical wiring, insulation, etc., and/or (4) to permit the foam to be placed in a vertical or largely unconfined position without running or falling out. A rapid change in the foam from a substantially liquid state to a gelled state is particularly essential for the last-mentioned characteristic. If the change from liquid to gel is not fast, the foam will not only adversely soak such porous materials, but also may break down in part and lose proper bonding of the foam to the building walls. However, as stated above, the gelling should not be completed until after the foam has been generated and flowed or placed in position because a foam in the fully gelled state is not readily flowed through pipes, hoses, orifices, nozzles, etc. without damage to the cellular structure. In contrast, a foam in which the liquid phase has not been gelled is readily hosed, piped, spread and flowed into position.

Consequently, the prior art gelling agents which cause instantaneous or uncontrollable gelation, cannot be used in such a method for foam preparation. Instead, it is necessary to use a method for controlled gelation. That is, a method whereby an aqueous polyvinyl alcohol solution containing a gelling agent which does not cause immediate gelation, but which causes rapid gelation upon proper convenient treatment after a desired time interval.

In other uses of aqueous polyvinyl alcohol solutions it is also desired to employ such controlled gelation methods. For example, in the application of coating compositions comprising aqueous polyvinyl alcohol solutions onto porous substrates such as paper or paperboard, it is desired to have a gelling agent incorporated into such composition which does not instantaneously gel the composition so that it may be conveniently applied onto the substrate but which will cause rapid gelation shortly thereafter to prevent the composition from soaking into the substrate.

An object of this invention is to provide an improved polyvinyl alcohol composition containing a gelling agent precursor which may be converted into a gelling agent upon convenient treatment. A further object is to provide a composition comprising polyvinyl alcohol and such a gelling agent precursor which will remain stable for extended periods of time without causing any significant crosslinking of the polyvinyl alcohol. Another object is to provide a composition comprising polyvinyl alcohol and such a gelling agent precursor, which composition can be formed into a stable fluid aqueous solution, but which solution upon convenient treatment will rapidly gel after a desired time interval. An additional object is to provide an improved method for the gelation of aqueous polyvinyl alcohol solutions. Still another object is to provide an improved method for the controlled gelation of aqueous polyvinyl alcohol solutions whereby such a gelling agent precursor is added to said solution which does not cause instantaneous gelation, but which upon convenient treatment causes rapid gelation after a desired time interval.

These and other objects are fully attained by the present invention which provides the composition comprising polyvinyl alcohol and a vanadium compound wherein the vanadium has a valence state of $+5$; and also provides the process of gelling an aqueous polyvinyl alcohol solution comprising contacting in said solution at a pH of from about 3 to 8, (1) a solution-soluble starting vanadium compound wherein the valence state of the vanadium is $+5$, and (2) a solution-soluble reducing reagent which converts said starting vanadium compound into a gelation compound which supplies reduced vanadium ions which crosslinks the polyvinyl alcohol, said reducing reagent being essentially inert in said solution in the absence of said starting vanadium compound. The reducing reagent should convert the starting vanadium compound into the gelation compound at a rate sufficiently slow that the starting vanadium compound and the reducing reagent can be uniformly distributed through the solution before the onset of gelation, preferably within 5 to 500 seconds after the starting vanadium compound and reducing reagent have been contacted in the solution.

The term "polyvinyl alcohol" refers to the water-soluble products obtained by the complete or partial alcoholysis or hydrolysis of polyvinyl esters such as polyvinyl acetate. Complete alcoholysis or hydrolysis indicates that 99–100% of the ester groups of the polyvinyl ester have been replaced by hydroxyl groups. Partial alcoholysis or hydrolysis indicates that 50–99% of the ester groups have been replaced by hydroxyl groups. A preferred polyvinyl alcohol is the commercially available, high molecular weight, fully hydrolyzed grade, having a 4% aqueous solution viscosity of 55–65 centipoises.

The prior art provides no teaching of the use of any vanadium compound to obtain the desired time controlled gelation of aqueous polyvinyl alcohol as explained above. It has now been discovered that when vanadium ions having the valence state of +5 are contacted with a reducing reagent in an aqueous polyvinyl alcohol solution at a pH within the range of about 3 to 8, the newly formed vanadium ions having a reduced valence state cause rapid crosslinking of the polyvinyl alcohol, and provide the desired controlled gelation.

The chemistry of this vanadium redox reaction is very complicated and the precise mechanics thereof are unknown. At a pH of greater than about 3, vanadium compounds wherein the vanadium has a valence state of +5, do not gel aqueous polyvinyl alcohol solutions. However, when such vanadium compounds are contacted with a reducing reagent in an aqueous polyvinyl alcohol solution at a pH within the range of about 3 to 8, the newly formed reduced vanadium ions, as stated above, do cause gelation. The valence state of the reduced vanadium ions is not known, but is speculated that they have a valence state of +4 or +3 or possibly a mixture of vanadium ions of both +4 and +3 valency are generated.

In the practice of this invention, a composition comprising polyvinyl alcohol and a vanadium compound wherein the valence state of the vanadium is +5 (herein referred to as "the starting vanadium compound") is prepared by any convenient manner. The manufacturer of polyvinyl alcohol can dry blend the polyvinyl alcohol and starting vanadium compound, using suitable ordinary mixing equipment, and the resulting dry mixture will remain stable for extended periods of time. The ultimate user can take this mixture and prepare an aqueous solution thereof, within the critical pH range, and then add a reducing reagent to gel the aqueous polyvinyl alcohol solution at a controlled rate. Alternately, an aqueous polyvinyl alcohol solution may be prepared first, and the starting vanadium compound and reducing reagent may be then added thereafter in accordance with this invention.

It is critical to this invention that the starting vanadium compound and reducing reagent be contacted in the polyvinyl alcohol solution at a pH within the range of about 3 to 8. At a lower pH, the starting vanadium compound itself effects crosslinking of the polyvinyl alcohol. At a pH of about 8 or higher the redox reaction is substantially retarded. In most instances it is preferred that the pH be within the range of about 5 to 7.

To insure intimate contact of the starting vanadium compound throughout the polyvinyl alcohol solution, it is necessary for this compound to be solution-soluble at least to the extent necessary to effect the subsequent gelation as explained below. That is, this starting vanadium compound must be soluble in the particular aqueous polyvinyl alcohol solution which is to be gelled, which usually contains an acid or acid salt to obtain the critical pH, and which may also contain other ingredients. The terms "solution-soluble" and "soluble" as used herein in accordance with standard art-recognized terminology, refer to both true solutions and colloidal solutions, since the essential requirement is intimate contact throughout the polyvinyl alcohol solution, which may be accomplished by either a true solution or a colloidal solution.

A solution-soluble reducing reagent is mixed into the aqueous polyvinyl alcohol solution, which converts the aforedescribed starting vanadium compound, by a redox reaction, into a gelation compound which supplies reduced vanadium ions which in turn effects crosslinking of the polyvinyl alcohol. In most instances it is desired to select a reducing reagent which reacts relatively slow with the starting vanadium compound to thereby permit the starting vanadium compound and reducing reagent to be uniformly distributed through the solution before the onset of gelation. Selection of an appropriate reducing reagent is within the ordinary skill of practitioners of the art, and is simply a matter of choosing a reducing reagent of such known reactivity as will permit sufficient time for handling the fluid aqueous polyvinyl alcohol solution, as is required in any particular application, after the starting vanadium compound and reducing reagent are contacted in the solution, but which will crosslink the polyvinyl alcohol to cause gelation within whatever time is desired.

Where a preformed aqueous polyvinyl alcohol solution is used, either the starting vanadium compound or the reducing reagent may be added to the polyvinyl alcohol solution first, or the two may be added simultaneously, as may be desired.

The newly formed reduced vanadium ions effect virtually instantaneous crosslinking of polyvinyl alcohol upon contact therewith. Therefore, as the reducing reagent begins to react with the starting vanadium compound, the gelation proceeds very rapidly, resulting in firm polyvinyl alcohol gels shortly after the onset of gelation, even though the redox reaction is not completed. Consequently, this invention provides practitioners of the art with a surprisingly new technique for gelation of aqueous polyvinyl alcohol solutions which permits the gelation agents to be mixed into a polyvinyl alcohol solution which then remains completely fluid for sufficient time to permit flowing, spraying, doctoring, or otherwise applying the solution onto a surface, or generation of a foam which can then be flowed or otherwise placed into position, but which then is very rapidly converted into a firm gelled structure.

The starting vanadium compounds used in this invention preferably are vanadate salts (the term "vanadate" being defined to be implicitly restricted to ions wherein the vanadium has the valence state of +5), such as ammonium vanadate, sodium vanadate, potassium vanadate, and the like. Suitable reducing reagents include sodium sulfide, sodium hydrosulfite, hydroxylamine hydrochloride, hydrazine, and the like. Obviously, the reducing reagent must be essentially inert in the aqueous polyvinyl alcohol solution in the absence of the starting vanadium compound. Otherwise, undesirable side-reactions may occur, and where the reducing reagent is added to the solution before the starting vanadium compound, the starting vanadium compound most likely would not be reduced to generate the essential reduced vanadium ions.

In the practice of this invention, the starting vanadium compound should be added to the polyvinyl alcohol in an amount effective to cause subsequent gelation of the aqueous polyvinyl alcohol solution after conversion of the starting vanadium compound to the gelation compound which provides the essential reduced vanadium ions. The precise lower limit of the concentration of the starting vanadium compound depends primarily upon the particular type of polyvinyl alcohol used, the concentration of the polyvinyl alcohol in the aqueous solution, and the strength or firmness of the ultimate gel which is desired. Generally, the starting vanadium compound must be used in an amount equivalent to at least about $1 \times 10^{-4}$ gram atom of vanadium per gram of polyvinyl alcohol, and in most instances, it is preferred to use the starting vanadium compound in an amount equivalent to at least about $2 \times 10^{-2}$ gram atoms of vanadium per gram of polyvinyl alcohol. There is no actual critical upper limit on the concentration of the starting vanadium compound. It should be noted that the strength or firmness of the gel is directly proportional to the amount of reduced vanadium ions present which crosslinks the polyvinyl alcohol, and large excess amounts of the reduced vanadium ions may cause a shrinkage of the resulting gel, which can squeeze water out of the gel. In many instances this result is immaterial; but where such a result is undesirable, the practitioner of the art may determine by routine experimentation, the operable upper concentration of the starting vanadium compound.

The amount of the reducing reagent to be added to the aqueous polyvinyl alcohol solution depends upon the concentration of the starting vanadium compound used. In view of the many variables affecting the selection of the concentration of the starting vanadium compound, it is impossible to state precise limits for the amount of the reducing reagent to be added to the solution. However, a sufficient amount of the reducing reagent should be contacted with the starting vanadium compound in the aqueous polyvinyl alcohol solution to generate an amount of reduced vanadium ions which is effective to gel the solution. Those skilled in the art will recognize that this amount of reducing reagent may be determined by routine experimentation.

This invention is further illustrated by the following examples. The mixing apparatus used in these examples consisted of two hypodermic syringes mounted adjacent to a vertical rod fitted with a sliding collar, arranged so that pressure on the collar forces liquids simultaneously from the syringes, and thence into a capillary T wherein the two liquids are mixed, and thence into a test tube. One of these syringes delivered two parts (by volume) of a polyvinyl alcohol solution and the other syringe delivered one part of a solution of an agent as indicated. The polyvinyl alcohol solution used in all examples was a 4.5 weight percent aqueous solution of a commercially available, high molecular weight, fully hydrolyzed polyvinyl alcohol, having a 4% aqueous solution viscosity of 55–65 centipoises. In these examples, percentages are expressed in terms of percent by weight.

*Example 1*

Two parts of a solution consisting of 10 ml. of polyvinyl alcohol solution and 0.1 ml. of 9% aqueous sodium hydrosulfite solution were mixed with one part of 0.3% aqueous ammonium vanadate solution (providing $2.88 \times 10^{-4}$ gram atoms of vanadium per gram of polyvinyl alcohol). The clear, colorless mixture was fluid after mixing, but began to gel after 30 seconds. The gel was firm in 45 seconds. The initial pH of 6.1 changed to 6.7 on standing.

*Example 2*

Two parts of a solution consisting of 10 ml. of polyvinyl alcohol solution, 0.5 ml. of 10% aqueous hydroxylamine hydrochloride solution, and 0.1 ml. of 5% aqueous cupric sulfate solution were mixed with one part of 1% aqueous ammonium vanadate solution (providing $1 \times 10^{-3}$ gram atom of vanadium per gram of polyvinyl alcohol). The mixture was clear, green and very fluid after mixing, but gelled firmly in 60 seconds. The initial pH of 5.3 changed to 4.8 on standing.

*Example 3*

Two parts of a solution consisting of 10 ml. of polyvinyl alcohol solution and 0.2 ml. of 4% aqueous sodium sulfide were mixed with one part of 0.5% aqueous ammonium vanadate solution (providing $4.85 \times 10^{-4}$ gram atoms of vanadium per gram of polyvinyl alcohol). A clear amber, fluid mixture was formed which formed a loose gel within a few seconds, and which became firm within three minutes. The gel was still elastic and firm after two days with a slight loss of transparency and a very small amount of syneresis.

I claim:

1. The process of preparing an aqueous polyvinyl alcohol solution which remains fluid for at least a few seconds after preparation and spontaneously gels thereafter, which process comprises contacting a gelable fluid aqueous polyvinyl alcohol solution at a pH of from about 3 to 8 with a pentavalent vanadium compound dissoluble therein to provide at least about $1 \times 10^{-4}$ gram atom of pentavalent vanadium per gram of polyvinyl alcohol, and a reducing agent dissoluble therein in amount at least effective to reduce said amount of pentavalent vanadium to a valence below 5 but ineffective alone to gel said polyvinyl alcohol solution.

2. Process of claim 1 wherein the amount of said pentavalent vanadium is at least about $2 \times 10^{-4}$ gram atom per gram of polyvinyl alcohol.

3. Process of claim 2 wherein said vanadium compound is a vanadate salt.

References Cited by the Examiner

FOREIGN PATENTS 886,467  10/1943  France.

MURRAY TILLMAN, *Primary Examiner.*

W. J. BRIGGS, Sr., *Assistant Examiner.*